United States Patent [19]

Littleton

[11] Patent Number: 5,161,212

[45] Date of Patent: Nov. 3, 1992

[54] GRAPHICS CURSOR HANDLER

[75] Inventor: James G. Littleton, Houston, Tex.

[73] Assignee: Texas Instruments Incorporated, Dallas, Tex.

[21] Appl. No.: 420,206

[22] Filed: Oct. 12, 1989

[51] Int. Cl.[5] .............................. G06F 15/20
[52] U.S. Cl. .................. 395/118; 395/148; 340/723
[58] Field of Search ......... 364/518, 521, 522; 340/747, 750, 798, 799, 723, 731; 395/118, 148; 382/47

[56] References Cited

U.S. PATENT DOCUMENTS

| | | | |
|---|---|---|---|
| 4,814,756 | 3/1989 | Chauvel | 340/750 |
| 4,920,504 | 4/1990 | Sawada et al. | 364/521 |
| 4,935,880 | 6/1990 | Kelleher et al. | 364/522 |

*Primary Examiner*—Gary V. Harkcom
*Assistant Examiner*—Phu K. Nguyen
*Attorney, Agent, or Firm*—Rose K. Castro; Robbie T. Holland; Richard L. Donaldson

[57] ABSTRACT

A method for handling a cursor during a graphics drawing routine that eliminates the need to insert cursor handling code into graphics function definitions. The method coordinates the placement of the cursor in screen memory with the reading out of the scan lines containing the cursor. During this time, the cursor background is saved in offscreen memory. The cursor is protected by a cursor violation region, and drawing may continue while the cursor is in screen memory so long as the cursor violation region is not infringed, in which case drawing ceases until the cursor is read out of memory. The method prevents the cursor from flickering and maximizes the availability of screen memory to the drawing routine.

42 Claims, 3 Drawing Sheets

GRAPHICS CURSOR HANDLER

TECHNICAL FIELD OF THE INVENTION

This invention generally relates to computer processing, and more particularly to handling a cursor during execution of a graphics drawing routine.

BACKGROUND OF THE INVENTION

In computer processing, a cursor is a symbol, such as an arrow or line, that is displayed on the screen at a specified location. In both text and graphics computer displays, the role of the cursor is to indicate an active location on the display screen. Despite this functional similarity, however, text mode and graphics mode cursors are created differently. Unlike text mode cursors in alphanumeric cell displays, which are hardware controlled, cursors in graphics systems are software created.

There are a number of conventions for showing a cursor in graphics mode. One convention is an old standard of changing the background color. Another cursor type is a thin vertical line. More recently, with the advent of icons and mouse-based interfaces, the cursor is in the form of an arrow or other symbol, which the user may point to a desired area of the screen.

Most graphics systems provide software for drawing a cursor by means of a shape table or raster, which is a rectangular pattern of bits that can be referenced and manipulated as one unit. These shapes are usually defined as a two-dimensional array of type boolean, so that a true value will cause a corresponding pixel to illuminate and a false value will cause that pixel to be turned off. In color displays, this two-dimensional array can consist of multiple bit data types. The cursor is moved about the screen by first erasing it from its previous location and then drawing it at its new location.

In interactive graphics, an important consideration is interference between the cursor and the graphics drawing functions. If a shape is to be drawn on the screen, the desired effect is to have the drawing occur without seeming to disrupt the cursor. In other words, the drawing routine should not overwrite the cursor. Meanwhile, the cursor's background must be saved in case a cursor-free picture is needed for a purpose other than screen display, such as for printing or storage for future use.

Many graphics systems require a programmer to insert special programming for excluding the cursor, into each graphics routine. For example, a polygon drawing routine must determine if the cursor is located in the region where the polygon is to be drawn. If so, the cursor must be removed from the screen memory. The polygon is then drawn, the cursor restored, and the background saved in offscreen memory. A disadvantage of this method of cursor handling is the inconvenience to the programmer of writing the cursor handling code. Another disadvantage is a flickering effect of the cursor because the cursor is not in screen memory when the lines where it would otherwise be are scanned.

Another method of cursor handling uses a computer interrupt on the scan line that coincides with the top of the cursor. An interrupt service routine places the cursor in screen memory during the time it is actually displayed, and during this time, saves the background in offscreen memory. A disadvantage of this method is that during the time the cursor is displayed, the interrupt function prevails and no other functions can be performed.

Thus, a need exists for a cursor handling method that does not require substantial programming effort and minimizes disruption of other system operations.

SUMMARY OF THE INVENTION

One aspect of the invention is a method for handling a cursor during execution of a graphics drawing routine, using a raster scan graphics system. For each frame scan, when the scan is near the scan line corresponding to the top of the cursor, the drawing routine ceases. The cursor background is saved and the cursor is placed in screen memory. A cursor violation region is set and the drawing routine is allowed to proceed. If the cursor violation region is violated, the drawing halts until the current scan line is near the bottom of the cursor, at which time the background is restored. This process is repeated for each frame scan.

A hardware aspect of the invention is a processor used in a computer system having a display system that uses a line by line scan, for handling a cursor during a graphics drawing routine. The processor is programmed to halt the drawing near the top of the cursor, save the cursor background, place the cursor on the screen, determine a cursor violation region, and permit the drawing to continue so long as no violation occurs.

Another aspect of the invention is a cursor handling mechanism for use during execution of a graphics drawing routine on a system having a window with a window checking routine. A cursor violation area is an area defined by a window that does not include the cursor, and a violation occurs if drawing is attempted outside that area. The programming comprises means for halting the drawing routine, during a frame scan, when the current scan line is near the top of the cursor, instructions for saving the cursor background, instructions for placing the cursor in screen memory, instructions for setting a cursor violation region, instructions for proceeding with the drawing while checking whether the cursor violation region is violated, means for halting the drawing when a violation occurs, and instructions for restoring the background.

Another aspect of the invention is a cursor handling mechanism for use during execution of a graphics drawing routine on a system having a special memory available for use as a cursor window. The mechanism is implemented with computer programming or devices containing programming, and comprises the same basic instructions as set out in the preceding paragraph, except that the cursor violation region and the definition of a cursor violation are different. The cursor violation region is an area containing the cursor and a violation occurs when drawing is attempted inside that area.

A technical advantage of the invention is that it improves the interrupt driven method of cursor handling. Rather than requiring all operations to cease while the lines containing the cursor are being scanned, the invention permits normal operations to continue so long as a defined cursor region is not overwritten.

BRIEF DESCRIPTION OF THE DRAWINGS

The novel features believed characteristic of the invention are set forth in the appended claims. The invention itself, however, as well as modes of use and further advantages, is best understood by reference to the following description of illustrative embodiments when read in conjunction with the accompanying drawings.

DETAILED DESCRIPTION OF THE INVENTION

The invention is directed to a programming tool used with graphics software, specifically graphics software that makes use of subprograms for specific drawing tasks. These subprograms are referred to herein as "drawing routines", which are called in software programs in the same manner as other software functions, procedures, and routines, with the terminology varying according to the programming language used.

Figure 1:
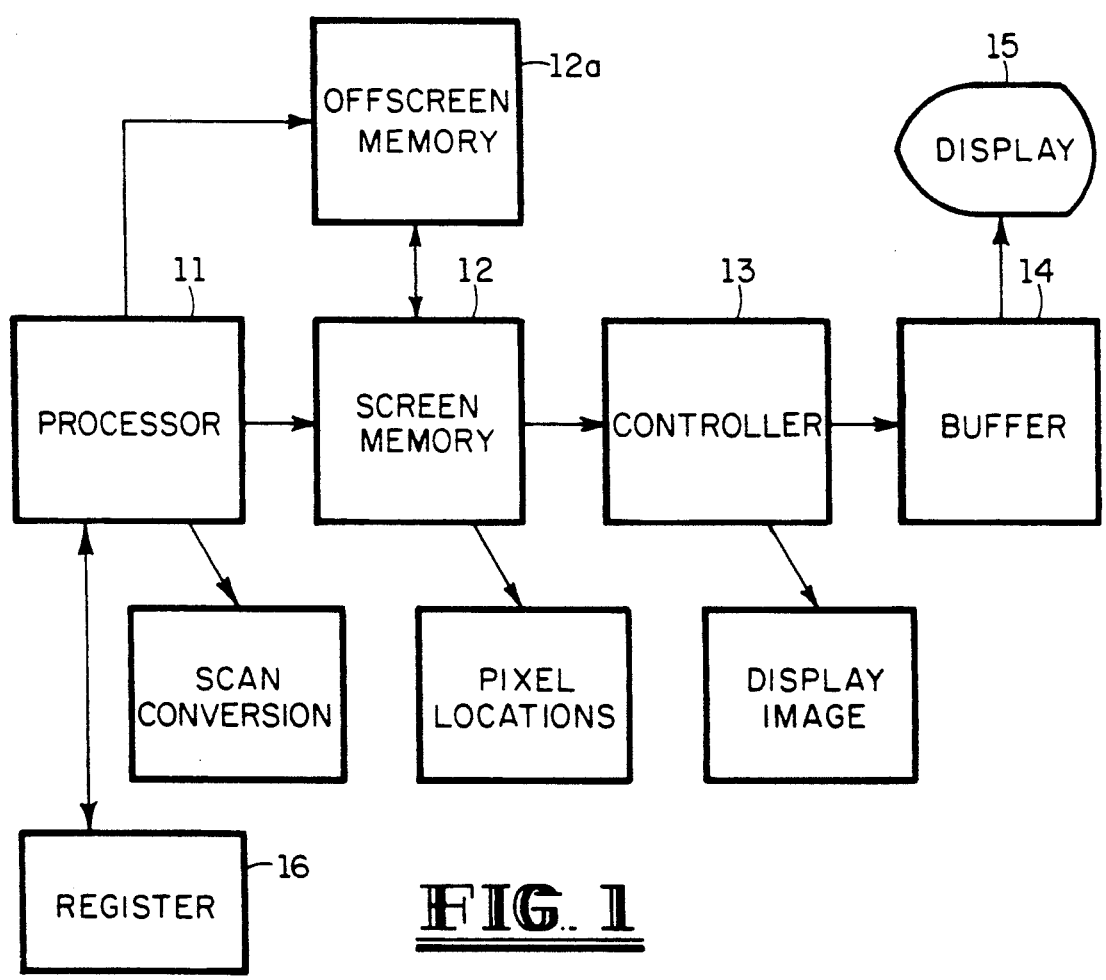
FIG. 1 is a block diagram of the hardware components of a computer graphics display system, such as used with the present invention.

The method of the invention is best understood with reference to FIG. 1, a block diagram of a typical raster scan graphics display, which is part of a graphics system and which may be used to implement the invention. A display system 10, comprises at least a processor 11, a memory 12, a display controller 13, a video buffer 14, and a display screen 15. Although the raster scan system of FIG. 1 is a commonly used graphics system, the invention may be used with other display systems, with the important configuration features being a screen memory and a line by line scan. A register 16 is used with one embodiment of this invention, as explained below in connection with FIG. 4.

Processor 11 may be the host processor of the system or may be a separate graphics processor that cooperates with the host. Processor 11 is capable of executing graphics instructions that, in varying levels of programming, cause pixels on display screen 15 to be illuminated in desired patterns. Processor 11 performs scan conversions, which convert abstract representations of an image into the appropriate pixel values in screen memory 12.

Screen memory 12 is typically a frame buffer or bit map, which may be distinct from the main system memory. Ideally, screen memory 12 is accessible to processor 11, thus allowing rapid update of the stored image. Screen memory 12 is an array, in which the number of rows correspond to the number of lines on display screen 15. The number of columns in the array are the same as the number of pixels on each line. The term "pixel" may be used to describe the row and column location in the frame memory that corresponds to the screen location, as well as to a location on the screen. Whenever a pixel is to be displayed on the screen 15, a specific value is placed into the corresponding memory location in screen memory 12. As explained below, to implement the invention, screen memory 12 is used in conjunction with other memory, which is simply referred to as "offscreen memory" 12a.

Controller 13 performs control functions, such as reading the contents of memory 12 into video buffer 14, which then converts digital representations of pixel values into analog voltage signals that are sent to display 15. The pixel values are thus transformed into a display image. Controller 13 cycles through memory 12, at a particular rate, to satisfy a desired rate for refreshing each frame of display 15. To avoid the user from detecting flicker, a standard refresh rate of 60 frames/second is used.

In the context of graphics software used with systems such as illustrated in FIG. 1, the invention improves the traditional interrupt driven method of cursor handling. This traditional method operates on screen memory as a frame scan proceeds. The interrupt is called when the scan line is at the top of a cursor in screen memory 12. An interrupt service routine controls all activity until the scan reaches the bottom of the cursor. This method eliminates the need for programmers to exclude the cursor by special programming in their graphics routines. It also eliminates flicker of the cursor because the cursor scan lines and the placing of the cursor in memory coincide in time. Yet, as is typical of interrupts and their service routines, execution of the service routine takes control of processor 11 so that no other operations can take place until the service routines ends. Thus, no drawing can occur during the interrupt. If the cursor is large, the duration of the interrupt can be quite disruptive.

A basic concept of the invention is that the traditional interrupt driven method of cursor handling can be improved by permitting graphics drawing to occur even while the cursor is in screen memory 12, so long as the drawing does not interfere with the cursor. The features of the traditional method are kept, in that the cursor and its background trade places in memory 12, with the cursor being in memory 12 only while its corresponding scan lines are being read out. But the presence of the cursor in memory 12 does not necessarily require a wait of all other operations while it is being read out.

Figure 2:
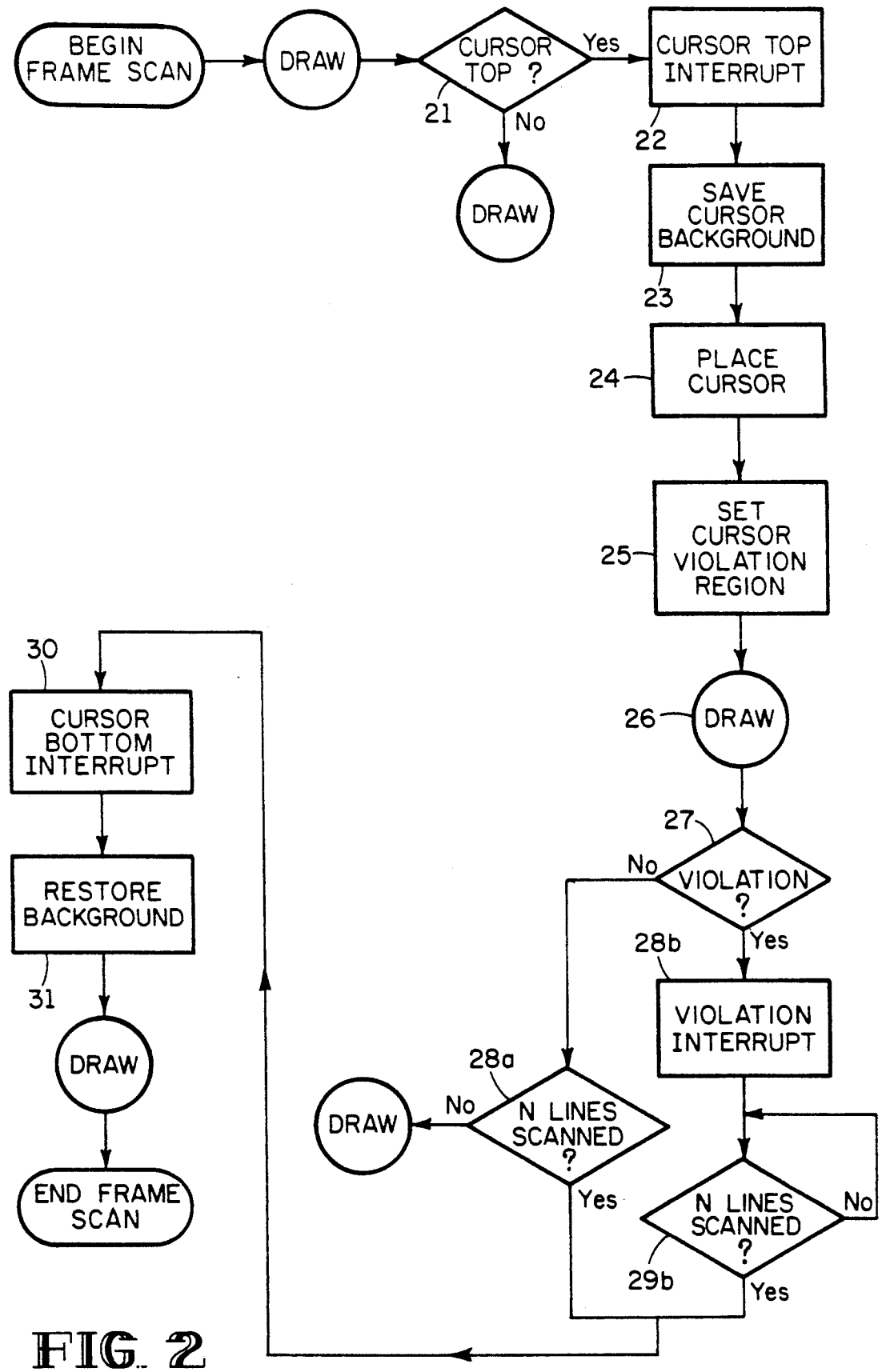
FIG. 2 is a block diagram illustrating the steps of the method of the invention.

The invention uses a cursor violation region to inform the graphics drawing routine where the cursor is. The drawing routine can then determine whether it is necessary to cease drawing in order to avoid overwriting the cursor. As explained below, in connection with FIGS. 2-4, the method has alternative implementations, depending on available hardware. Referring now to FIG. 2, the method of the invention is used during a frame scan and is repeated for each new refresh. While the scan reads values out of memory 12, a graphics drawing routine places values in screen memory 12, subject to non violation of a cursor violation region as explained below. The drawing routine is indicated in FIG. 2 as DRAW. The drawing routine is re-entrant at any number of points during the method, which means that after any interruption, the routine continues where it left off. If the routine terminates by its own definition during the frame scan, control is returned to the next higher level of programming at any appropriate entry point.

The basic steps shown in FIG. 2 are the same for all implementations of the invention. For each frame scan, when the scan is just above the scan line corresponding to the top of the cursor, the drawing routine ceases. The cursor background is saved and the cursor is placed in screen memory. A cursor violation region is set, which informs the drawing routine about the location of the cursor. The drawing routine is then allowed to proceed, but if the cursor violation region is violated, the drawing ceases until the scan is at the bottom of the cursor, at which time the background is restored. This process is repeated for each frame scan.

The embodiment explained below uses interrupts and interrupt service routines to perform the steps of the method. Such interrupts are a common feature of present day computer systems, but other means of discontinuing the drawing routine to service the steps of the method could be programmed.

In accordance with the above summary, step 21 is checking for the relationship between the current scan line and the top of the cursor, so that this information can be provided to the drawing routine. Preferably, the drawing routine is informed when the scan is n lines above the scan line where the top of the cursor is to be located in memory 12. The n represents the number of lines scanned in the time it takes to save the background where the cursor is to be located and to place the cursor on the screen. The cursor location is located in globally accessible memory. This location is updated by the service application program or by the system service that defines and moves the cursor. Assuming that a cursor is to be on the screen, step 22 is halting the drawing routine when the cursor top is reached in accordance with step 21. In the embodiment described herein, step 22 is accomplished by generating an interrupt, which begins an interrupt service routine that performs subsequent steps until control is returned to the drawing routine.

Step 23 is saving the background where the cursor is to be located. The save may be to a heap or to offscreen memory 12a, or any other conveniently accessed memory device. This background save is necessary because the cursor and its background cannot exist in memory 12 at the same time. The saving of the background permits it to be later restored so that a complete cursor-free image will exist in memory 12 for at least part of the time it takes for the scan of one frame.

Step 24 is placing the cursor in screen memory 12. At this time, the scan is at the top of the cursor and the cursor begins to be drawn on screen 15. As will become evident below, the cursor is in memory 12 only for the limited time required for N scan lines, where N is height of the cursor. From the point of view of one who views screen 15, however, the persistence of screen 15 causes the cursor to appear to be flicker-free.

Step 25 is setting a cursor violation region, which sets certain bounds in screen memory 12 to protect the cursor while the cursor is in memory 12. As indicated above, the specific implementations of the invention vary depending on available hardware.

Figure 3:
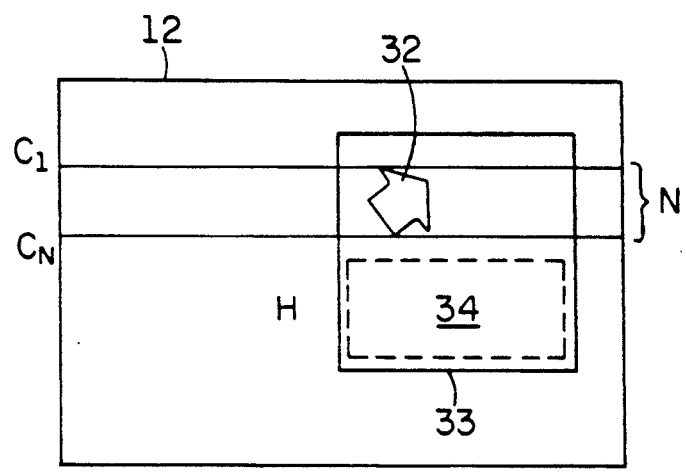
FIG. 3 illustrates the screen memory, cursor violation region, and cursor during a frame scan for the software method of the invention.

In one implementation, referred to as a software implementation, the cursor violation region is the largest area of a cursor violation region that does not include the cursor. FIG. 3 depicts screen memory 12 in this first implementation. The graphics system used with this implementation provides a window checking routine, which confines drawing operations to a specified window in the address space of memory 12. The window is a rectangular region of display memory specified in terms of the x,y coordinates of the pixels in its two extreme corners. This window is often referred to as a clipping rectangle. A window violation interrupt may be generated when an attempt is made to write to a pixel outside the window. This is an increasingly common feature of graphics display hardware.

As shown in FIG. 3, mapped on to screen memory 12 is a window 33 containing cursor 32. In accordance with the invention, the window is re-set to a cursor violation region 34, which is H scan lines tall, where H represents the height of the largest area of window 33 not containing cursor 32. Scan line $C_1$ is at the top of cursor 32, and scan line $C_N$ is at the bottom of cursor 32. Although an interrupt is generated on line $C_1$, its service routine does not require a wait for N lines, but rather permits the drawing routine to proceed so long as it stays within the cursor violation region 34.

In a second implementation, referred to as a hardware implementation, in which the hardware system provides a special register, shown as register 16 in FIG. 1, to store the location and horizontal and vertical extent of a cursor violation region. Thus, the cursor violation region is only a small area containing the cursor. For convenience, the register 16 stores certain information, i.e., the origin (x, y) and extent (width, height) pertaining to the small rectangle surrounding the cursor. Although this embodiment uses a register 16, other memory means could be used, such that the location of the cursor violation region is readily available to the graphics programming.

Figure 4:
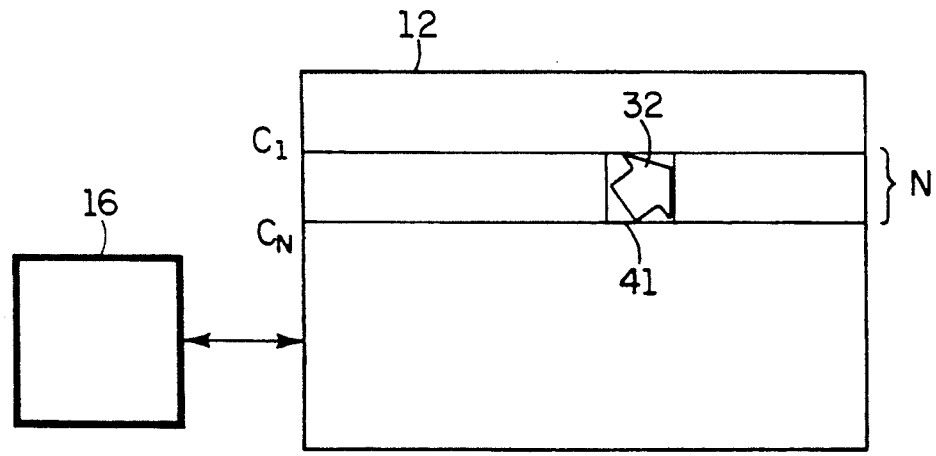
FIG. 4 illustrates the screen memory, cursor violation region, and cursor during a frame scan for the hardware method of the invention.

FIG. 4 depicts screen memory 12 in this second implementation. Cursor violation region 41 is N lines high, where N represents the number of scan lines of cursor 32. A window violation interrupt may be generated with an attempt is made to write to a pixel inside the cursor violation region. As shown in FIG. 4, cursor window 41 is mapped on to screen memory 12. As in FIG. 3, scan line $C_1$ is at the top of cursor 32 and scan line $C_N$ is at the bottom of cursor 32. When the cursor is begun to be drawn, the drawing continually checks the values in register 16 to ensure that no cursor overwrite will occur. If an overwrite would occur, the cursor violation region 41 is considered to be violated. Although an interrupt is generated on line $C_1$, its service routine does not require a wait for N lines, but rather permits the drawing routine to proceed so long as it stays outside cursor violation region 41.

Referring again to FIG. 2, regardless whether the software or hardware implementation is used, after the cursor violation region is set, step 26 is returning system control to the graphics drawing routine, which is permitted to draw so long as there is no cursor region violation.

Step 27 is monitoring the relationship of the drawing routine to the cursor location to determine if a cursor region violation occurs. As explained in connection with step 25, what constitutes a violation may vary according the specific implementation.

So long as no violation occurs, the next step, step 28a, is simply waiting until N lines have been scanned, where N represents the scan lines corresponding to the cursor.

If a violation occurs, step 28b is halting the drawing routine, which may be accomplished by generating a violation interrupt. Then, step 29b is waiting until N scan lines have been scanned, where N represents the scan lines corresponding to the cursor.

Step 30 occurs at the bottom of the cursor, where the drawing ceases so that the background may be restored. This may be accomplished with a cursor bottom interrupt.

Step 31 is restoring the cursor background to memory 12, which may be accomplished with an interrupt service routine. Because the cursor and its background cannot be in memory 12 at the same time, step 28 includes removing the cursor from memory 12. The restoring of the background ensures that the cursor is in memory 12 only during the time that it is needed for the scan lines to cause its to appear on the screen 15. The restoring of the background permits drawing into it if required by the drawing routine and provides a complete image in memory.

Although not shown in FIG. 2, in the software implementation of the invention, a final step includes restoring the cursor violation region to the original size of the drawing window.

Although the invention has been described with reference to specific embodiments, this description is not meant to be construed in a limiting sense. Various modifications of the disclosed embodiment, as well as alternative embodiments of the invention will become apparent to persons skilled in the art upon reference to the description. It is, therefore, contemplated that the appended claims will cover such modifications that fall within the true scope of the invention.

What is claimed is:

1. A method for handling a cursor during execution of a graphics drawing routine comprising the steps of:
   halting said drawing routine during a frame scan any time before a line by line scan reaches the line corresponding to the top of said cursor in screen memory;
   saving the cursor-free image background of said cursor;
   placing said cursor in screen memory;
   setting a cursor violation region to inform said drawing routine about the location the said cursor;
   proceeding with said drawing routine, while checking whether said drawing routine attempts to write to a pixel protected by said cursor violation region; and
   halting said drawing routine if said drawing routine attempts to write to a pixel protected by said cursor violation region;
   waiting until said scan is at the scan line corresponding to the bottom of said cursor; and
   restoring said cursor-free image background.

2. The method of claim 1, wherein said step of halting said drawing routine when said current scan line is near said scan line corresponding to the top of said cursor is accomplished by generating a cursor top interrupt.

3. The method of claim 1, wherein said step of halting said drawing routine when said current scan line is near said scan line corresponding to the top of said cursor occurs when said scan line is n line above the top of said cursor, where n represents the number of lines scanned in the time required to save the cursor backround and place the cursor in screen memory, and where n is an integer greater than or equal to 1.

4. The method of claim 1, wherein said step of saving the background image of said cursor comprises saving said background image to offscreen memory.

5. The method of claim 1, wherein said step of placing said cursor in memory occurs when said scan line is on the line corresponding to the top of said cursor.

6. The method of claim 1, wherein said cursor violation region is within a window provided by said graphics system and said step of proceeding with said drawing routine comprises checking whether drawing occurs outside said region 7. The method of claim 1, wherein said cursor violation region is bounded by coordinates stored in a special memory location provided by said graphics system, and said step of proceeding with said drawing routine comprises checking whether drawing occurs inside said region.

8. The method of claim 1, wherein said special memory location is a register.

9. The method of claim 1, wherein said step of halting said drawing routine if said drawing routine attempts to write to pixels protected by said cursor violation region comprises generating a cursor violation interrupt.

10. The method of claim 1, wherein said step of restoring said background image is initiated by generating a cursor bottom interrupt when said scan line corresponds to the bottom of said cursor.

11. A cursor handling mechanism for use during execution of a graphics drawing routine on a system using a line by line scan and having a window checking routine, comprising:
   means for halting said drawing routine during a frame scan any time before the line by line scan reaches the line corresponding to the top of said cursor in screen memory;
   instructions for saving the cursor-free image background of said cursor;
   instructions for placing said cursor in screen memory;
   instructions for setting a cursor violation region to inform said drawing routine about the location of said cursor;
   instructions for proceeding with said drawing routine, while checking whether said drawing routine attempts to write to a pixel protected by said cursor violation region;
   means for halting said drawing routine if said drawing routine attempts to write to a pixel protected by said cursor violation region; and
   instructions for restoring said cursor-free image background when said current scan line is near the scan line corresponding to the bottom of said cursor;
   wherein said instructions and halting means are in a syntax, and are executable by a processor of said graphics system.

12. The cursor handling mechanism of claim 11, wherein said means for halting said drawing routine when said current scan line is near said scan line corresponding to the top of said cursor, is a cursor top interrupt.

13. The cursor handling mechanism of claim 11, wherein said means for halting said drawing routine when said scan is near said scan line corresponding to the top of said cursor, executes when said scan is n lines above the top of said cursor, where n represents the number of lines scanned in the time required to save said cursor-free image background and place said cursor in screen memory and n is an integer greater than or equal to 1.

14. The cursor handling mechanism of claim 11, wherein said instructions for placing said cursor in memory execute when said current scan line is on the line corresponding to the top of said cursor.

15. The cursor handling mechanism of claim 11, wherein said instructions for setting a cursor violation region comprise setting said window to a size that represents the largest area not containing said cursor, and said instructions for proceeding with said drawing routing comprise instructions for checking whether drawing occurs outside said region.

16. The cursor handling mechanism of claim 11, wherein said means for haltine said drawing routine if said drawing routine attempts to write to pixels protected by said cursor violation region, is a cursor violation interrupt.

17. The cursor handling mechanism of claim 11, wherein said instructions for restoring said background image are initiated by a cursor bottom interrupt when said current scan line corresponds to the bottom of said cursor.

18. A cursor handling mechanism for use during execution of a graphics drawing routine on a system using a line by line scan and having a special memory available or use as a cursor violation region, comprising:
   means for halting said drawing routine during a frame scan any time before the line by line scan reaches the line corresponding to the top of said cursor in screen memory;
   instructions for saving the cursor-free image background of said cursor
   instructions for placing said cursor in screen memory;
   instructions for setting a cursor violation region to inform said drawing routine about the location of said cursor;
   instructions for proceeding with said drawing routine, while checking whether said drawing routine attempts to write to a pixel protected by said cursor violation region;
   means for halting said drawing routine if said drawing routine attempts to write to a pixel protected by said cursor violation region; and
   instructions for restoring said cursor-free image background when said current scan line is near the scan line corresponding to the bottom of said cursor;
   wherein said instructions and halting means are in a syntax, and are executable by a processor of said graphics system.

19. The cursor handling mechanism of claim 18, wherein said means for halting said drawing routine when said current scan line is near the scan line corresponding to the top of said cursor, is a cursor top interrupt.

20. The cursor handling mechanism of claim 18, wherein said means for halting said drawing routine when said scan is near the scan line corresponding to the top of said cursor, executes when said scan line is n lines above the top of said cursor, where n represents the number of lines scanned in the time required to save the cursor background image and place the cursor in screen memory.

21. The cursor handling mechanism of claim 180, wherein said instructions for placing said cursor in memory execute when said scan line is on the line corresponding to the top of said cursor.

22. The cursor handling mechanism of claim 18, wherein said instructions for setting a cursor violation region provides means for storing the coordinates of said region in said special memory provided by said graphics system, and said instructions for proceeding with said drawing routine comprise means for checking whether drawing occurs inside said region.

23. The cursor handling mechanism of claim 18, wherein said means for halting said drawing routine if said drawing routine attempts to write to a pixel protected by said cursor violation region, is a cursor violation interrupt.

24. The cursor handling mechanism of claim 18, wherein said instructions for restoring said background image are initiated by a cursor bottom interrupt when said current scan line is near the bottom of said cursor.

25. A computer system for computer graphics and using a cursor comprising:
   a processor;
   screen memory connected to said processor and having data including a cursor-free image background where the cursor is to be;
   a video buffer connected to said screen memory; and
   a display controller connected to said screen memory and to said video buffer,
   wherein said processor is programmed with a drawing routine and programmed to halt said drawing routine during a frame scan, any time before the line by line scan reaches the line corresponding to the top of said cursor in said screen memory, to save the cursor-free image background of the cursor, to place data representation of the cursor in the screen memory, to determine a cursor violation region, and to permit said drawing routine to continue for so long as said drawing routine does not attempt to write to a pixel protected by said cursor violation region.

26. The computer system of claim 25 further comprising a display unit wherein said video buffer is further coupled to an input of said display unit.

27. The computer system of claim 25 wherein said processor comprises a host processor for the system and a graphics processor connected with said host processor.

28. The computer system of claim 25 wherein said processor is capable of executing graphics instructions that cause pixels on the display screen to be illuminated in desired patterns.

29. The computer system of claim 25 wherein said processor is programmed to convert abstract representations of an image into appropriate pixel values in said screen memory.

30. The computer system of claim 25 wherein said screen memory comprises an array in which the number of rows correspond to the number of lines in the display screen and the number of columns in the array are the same as the number of pixels on each line.

31. The computer system of claim 25 further comprising an offscreen memory connected to said screen memory wherein said offscreen memory is used to save the background image while the cursor is stored in said screen memory.

32. The computer system of claim 25 wherein said screen memory comprises a bit mapped frame buffer.

33. The computer system of claim 25 wherein said controller is operative to perform control functions, including reading the contents of said screen memory into said video buffer, said video buffer having circuitry operative to convert digital representations of pixel values into analog voltage signals for display.

34. The computer system of claim 25 wherein said controller is operative to cycle through said memory, at a particular rate, to satisfy a desired rate for refreshing each frame of said display.

35. A computer system comprising:
   a host processor;
   a graphics processor connected to said host processor;
   screen memory connected to said graphics processor;
   wherein said graphics processor is programmed to halt a drawing routine during a frame scan any time before a line by lien scan reaches the line corresponding to the top of said cursor in said screen memory, to save from said screen memory a cursor-free image background of a cursor and to place data representing the cursor in the screen memory, to determine a cursor violation region, and to execute said drawing routine for so long as said drawing routine does not attempt to write to a pixel protected by said cursor violation region.

36. The computer system of claim 35 further comprising a display unit coupled to said graphics processor.

37. A method for handling a cursor during execution of a graphics drawing routine, comprising the steps of:
setting a cursor violation region to inform said drawing routine about the location of said cursor;
proceeding with said drawing routine while checking whether said drawing routine attempts to write to a pixel protected by said cursor violation region;
halting said drawing routine during a frame scan if said drawing routine attempts to write to a pixel protected by said cursor violation region; and
resuming said drawing routine when said frame scan is at the scan line corresponding to the bottom of said cursor.

38. The method of claim 37, wherein said step of halting said drawing routine during said frame scan is accomplished by generating a cursor top interrupt.

39. The method of claim 37, wherein said step of halting said drawing routine when said current scan line is near said scan line corresponding to the top of said cursor occurs when said scan line is n lines above the top of said cursor, where n represents a number of liens scanned in a time interval utilized to save the cursor background from a memory and place the cursor in the memory, and n is an integer greater than or equal to 1.

40. The method of claim 37, wherein said cursor violation region is within a window defined by data generated by a graphics system and said step of proceeding while checking comprises checking whether drawing occurs inside said region.

41. The method of claim 37, wherein said step of halting said drawing routine if said drawings routine attempts to write to a pixel protected by said cursor violation region comprises generating a cursor violation interrupt.

42. The method of claim 37, further comprising a step of restoring said background image in the memory by generating a cursor bottom interrupt when said scan line corresponds to the bottom of said cursor.

* * * * *